June 20, 1972  F. C. ARRANGE  3,671,319
BATTERY ELECTRODE AND BATTERY EMBODYING SAME
Filed Aug. 4, 1969
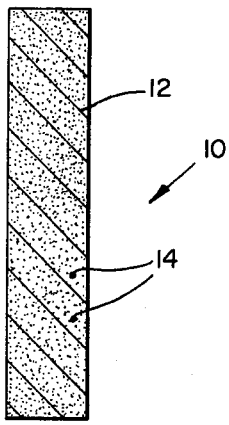
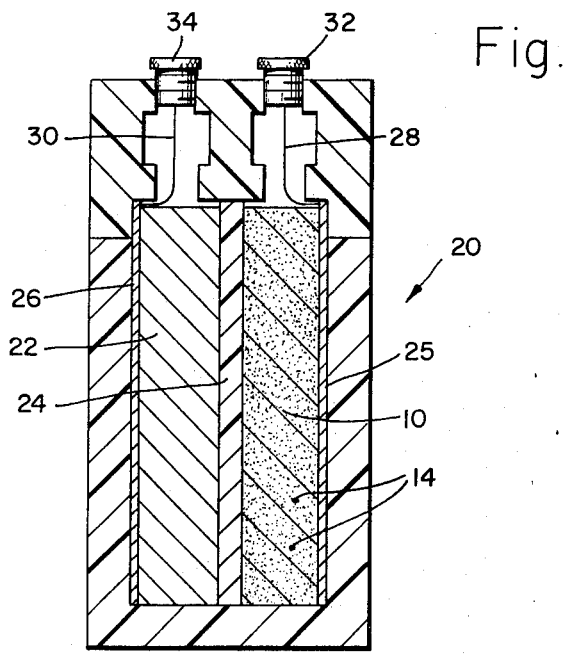
Frank C. Arrance,
INVENTOR.
BY.
Max Gelden
ATTORNEY.

United States Patent Office 3,671,319
Patented June 20, 1972

3,671,319
BATTERY ELECTRODE AND BATTERY EMBODYING SAME
Frank C. Arrance, Costa Mesa, Calif., assignor to McDonnell Douglas Corporation, Santa Monica, Calif.
Filed Aug. 4, 1969, Ser. No. 847,332
Int. Cl. H01m 35/00, 43/02
U.S. Cl. 136—6
15 Claims

ABSTRACT OF THE DISCLOSURE

Production of zinc electrode of improved strength and reduced solubility in alkali solution and having improved capacity retention during deep discharge cycling when employed in a high energy density battery, such as a silver-zinc battery, by sintering a mixture of zinc oxide and certain additive oxides such as zirconium oxide, and forming a solid solution of a portion of the zinc oxide and said additive oxide, said sintered solid solution forming a substantially inert matrix and the remainder of said zinc oxide being free active zinc oxide.

---

This invention relates to batteries, particularly high energy batteries, and is especially concerned with the provision of an improved zinc electrode structure for use in batteries, to improved battery construction embodying such electrode, and to procedure for producing such electrode.

Batteries are an important source of energy storage for power generation in air-borne systems. An important type of battery particularly suited for such applications are the high energy density alkaline electrolyte cells such as the silver-zinc and nickel-zinc batteries. High energy density batteries are generally battery systems which have a substantially higher energy per unit of weight than conventional, e.g., lead, storage batteries. In addition to important air-borne applications, such high energy density batteries have many other applications such as in portable tools and appliances, television, radio and record players, engine starting, portable X-ray units and the like.

In high energy density batteries such as silver-zinc batteries, the electrodes are placed adjacent opposite sides of a membrane or separator which performs the function of retaining electrolyte, separating the electrodes, and preventing migration of electrode ions which short circuit the battery. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

Zinc electrodes used e.g. in silver-zinc batteries are conventionally made by pasting zinc oxide to a metal screen or by compressing zinc oxide powder into a compact form or pellet. However, the physical integrity of such zinc electrodes is difficult to maintain at room temperature and is particularly difficult to maintain at temperatures of the order of 100° C. and above. Such zinc electrodes have relatively short life due to slumping of the paste mixture, or compressed powder, and electrochemical changes during charging and discharging, and such electrodes are not in the form of a strong disc or shape having a set geometrical physical form and structure. Thus, for example, even when such zinc electrode is placed directly in contact with the battery separator, slumping and segregation of the electrode material toward the bottom of the electrode compartment occurs, making it difficult to maintain good uniform contact between the zinc electrode and the separator, and also between the zinc electrode and the electrode collector screen, and causing changes in electrode characteristics.

Another major limitation of electrochemical cells or batteries employing zinc electrodes is loss of capacity of the zinc electrode during charge-discharge cycling, particularly during deep discharge cycling. This results from a combination of factors including physical changes of the electrode shape resulting from slumping, as noted above, and also solubility of the zinc oxide in alkali solution, e.g. potassium hydroxide aqueous electrolyte solution generally used as electrolyte in high energy density batteries. Thus, for example, zinc-silver batteries employing inorganic separators generally are capable of only about 50 total discharge cycles before they lose capacity and are unable to deliver nominal cell capacity on discharge. Recently developed inorganic separators, both rigid and flexible, are capable of providing substantially longer life when incorporated in high energy density batteries such as silver-zinc batteries, e.g. up to several hundred total discharge cycles without shorting. Cell life is generally limited, however, by the performance of the zinc or zinc oxide electrode.

The above disadvantages of zinc electrodes are substantially avoided according to the present invention, by forming a sintered solid solution of a portion of the zinc oxide with another suitable oxide as described more fully hereinafter, in amount to substantially decrease the solubility of the resulting electrode without significantly impairing the capacity or performance of the electrode. In addition, the solid solution thus formed between a portion of the zinc oxide and the additive oxide, provides an inert matrix which is not electrochemically reduced during charging. Such matrix also provides physical support for the remaining free active zinc oxide to provide a zinc oxide electrode which maintains its physical shape, minimizing slumping or disintegration of the zinc electrode. The resulting electrode particularly has the advantage of substantially improved capacity during deep discharge cycling of a battery containing the improved electrode, as compared to batteries employing conventional or prior art zinc electrodes.

Thus, according to the invention, there is provided a process for preparing a zinc electrode of improved strength and reduced solubility in alkali solutions, which comprises mixing a zinc compound such as zinc oxide with an additive metal compound such as the corresponding metal oxide, as described more fully hereinafter, compacting said mixture into an electrode shape, sintering such compacted mixture to form an electrode consisting essentially of a solid solution of a portion of the zinc compound in the form of zinc oxide and said metal compound in the form of the additive metal oxide, the remainder of the zinc compound or zinc oxide being present as free active zinc oxide. The resulting zinc electrode thus comprises the combination of (a) a sintered solid solution of zinc oxide and the metal oxide additive, and (b) zinc oxide. The sintered solid solution (a) forms a substantially inert matrix for the zinc oxide (b) constituting the active electrode material.

The metal compound or metal oxide additive incorporated with the zinc compound or zinc oxide to form a mixture which provides a solid solution upon sintering according to the invention, is a compound or oxide of a metal capable of entering the zinc oxide lattice in order to form a solid solution. Thus, the atomic size of the metal of the additive metal oxide should be about ±12% the atomic size of zinc. Also, the additive oxide should be one which upon forming the solid solution results in low solubility of such solid solution in KOH, and the additive oxide should not be readily reduced electrochemically. Examples of metals which form suitable metal oxide additives of this type are Zr, Sn, Ti, Cr, V, Co, Fe, Al, Ga, Y, Sc, Ni, Mn, La, Ce, Ba, Mg, Cu, Ag and Li. Preferred additives are oxides of the metals Zr, Ti and Mg, with best results obtained employing zirconium dioxide (zirconia), the resulting sintered solid solution $ZnO-ZrO_2$ anode retaining its original capacity over a large number of charge-discharge cycles.

Although in preferred practice the zinc and additive metal compounds are initially in the form of their oxides, other compounds of zinc and of the additive metal can be employed. These include the carbonates, sulfates and chlorides of zinc and of the additive metals, since these materials upon heating or sintering in the presence of air will be converted to the corresponding oxides. Thus, for example, a mixture of zinc carbonate and barium carbonate can be utilized.

Further, it will be understood that the zinc compound, preferably zinc oxide, can be incorporated with a mixture of the additive metal compounds or metal oxides, such as a mixture of zirconium oxide and titanium oxide.

In carrying out the invention for obtaining an improved zinc electrode according to the invention, a mixture of zinc oxide and additive metal oxide such as zirconium oixde, or other compounds of zinc and additive metal as noted above, are mixed in proportions generally within certain ranges. Thus, the starting mixture can contain from about 30 to about 99% zinc oxide and from about 1 to about 70% of the additive metal oxide, by weight. Preferably a major portion of the initial starting mixture is comprised of zinc oxide, most desirably employing about 75 to about 98% zinc oxide, and about 2 to about 25% of the additive metal oxide, by weight.

Following mixing of the zinc compound and additive metal compound, e.g. zinc oxide and additive metal oxide such as zirconium oxide, under conditions to form a substantially homogeneous mixture, the resulting mixture is first compacted, e.g. at pressure ranging from about 2000 to about 10,000 p.s.i., into the form or shape of the desired electrode, e.g. in the form of a disc. Such compressed electrodes are then subjected to sintering at temperatures ranging from about 600 to about 1400° C., preferably from about 800 to about 1200° C. Sintering is carried out for a period sufficient to convert a portion of the zinc oxide, and the major portion or substantially all of the additive metal oxide, usually present in minor portion in the starting mixture, into a solid solution as described above. This generally requires a period of sintering which can range from about 1 to about 50 hours, usually in the range of about 2 to about 24 hours.

By controlling the relative proportions of zinc oxide and additive metal oxide in the initial mixture, and by controlling the temperature and sintering time, only a portion of the zinc oxide in the initial mixture combines with the additive metal oxide to form the sintered solid solution, which is not reducible during charging of the battery, leaving a substantial portion of the initial zinc oxide as free active zinc oxide which can be reduced during charging and can function in a conventional manner as a zinc electrode. Generally about 2 to about 60% of the initial zinc compound or zinc oxide is tied up with the additive metal oxide, e.g. zirconium oxide, to form the solid solution and about 40 to about 98% of the zinc oxide is free as active zinc oxide. Preferably however a minor portion of the zinc oxide in the initial mixture is combined with the additive metal compound or metal oxide to form the solid solution, and preferably about 5 to about 20% of the total zinc oxide in the mixture combines with the additive metal oxide to form the solid solution, and about 80 to about 95% of the initial zinc oxide remains as free active zinc oxide. It is desirable to have a substantial and preferably major portion of the initial zinc oxide remain as free zinc oxide to provide a zinc electrode of high capacity and high electrical efficiency, but with sufficient of the initial zinc oxide combined with the additive metal oxide as a sintered solid solution to provide a matrix and support for the free active zinc oxide and provide an improved zinc electrode having the advantageous properties previously noted. Any remaining free additive metal oxide acts as a dilutant of the free zinc oxide without any significant adverse effects.

The invention will be more radily understood by the description below taken in connection with the accompanying drawing wherein:

FIG. 1 illustrates an improved zinc electrode according to the invention; and

FIG. 2 illustrates a battery embodying the improved zinc electrode of the invention.

The zinc electrode illustrated at 10 in FIG. 1 of the drawing is thus composed of a matrix in the form of a sintered solid solution of zinc oxide and a metal oxide additive as described above, said matrix being indicated at 12, having particles of free active zinc oxide as indicated at 14, distributed essentially uniformly throughout and supported by the solid solution matrix 12. Such sintered solid solution matrix generally contains from about 30 to about 99% zinc oxide and about 1 to about 70% of the additive metal oxide, by weight. Preferably, as previously noted, the sintered solid solution matrix 12 is present in minor proportion ranging from about 2 to about 25% by weight of the overall electrode 10.

The structure of the solid solution matrix 12 forming the support for the active zinc oxide particles 14 in the zinc electrode 10 can be readily identified by crystallographic and X-ray diffraction methods, such structure generally being in the form of ionic substitution in isostructural groups wherein each group is capable of entering the lattice of the other.

Numeral 20 of FIG. 2 represents a battery of the high energy density type containing the improved zinc electrode 10 according to the invention, and a conventional silver electrode 22, with a separator 24, preferably an inorganic separator of the types described hereinafter, disposed between the electrodes 10 and 22. Metal collector screens 25 and 26 are in contact with the zinc and silver electrodes 10 and 22, respectively, and such screens are connected by means of lead wires 28 and 30, to terminals 32 and 34, respectively, of the battery.

The separator 24 can be of inorganic or organic materials, and is preferably inorganic. Inorganic separator materials which can be used include variety of porous inorganic or ceramic substances. Thus, for example, suitable inorganic separator materials include insoluble hydrous metal oxides such as the hydrous oxides of zirconium, titanium and antimony. Other inorganic separators which can be employed are sintered aluminosilicates, especially the alkali metal and alkaline earth metal aluminosilicates, as described in Pat. No. 3,379,570.

Other types of inorganic separators which can be employed include those in the form of a sintered porous solid solution of magnesium silicate and a member selected from the group consisting of zinc silicate and iron silicate, including the naturally occurring magnesium-iron silicate known as the mineral olivine, as described it Pat. No. 3,446,668. An olivine separator of this type can be prepared for example, by sintering at 1200° C. a natural olivine consisting essentially of 41.4% $SiO_2$, 49.3% MgO and 7.7% iron oxide (FeO and $Fe_2O_3$) by weight, the remainder consisting essentially of trace amounts of CaO and $Cr_2O_3$.

Also, there can be employed the inorganic separators in the form of a sintered porous solid solution of an aluminum-bearing material such as aluminum oxide, and a substance selected from the group consisting of chromium, cobalt, nickel, magnesium, calcium and iron-bearing materials, e.g. a mixture of aluminum and chromic oxide, as described in Pat. No. 3,446,669.

Still another form of inorganic separator which can be employed according to the invention are porous sintered separators consisting essentially of a solid solution of a major portion of magnesium oxide and a minor proportion of an oxide such as zirconium dioxide, chromic oxide, aluminum oxide, titanium dioxide, and certain other oxides, as described in copending application Ser. No. 727,394, filed May 8, 1968 of Frank C. Arrance, et al., now Pat. No. 3,575,727.

Also, inorganic separator materials derived from natural chromite, termed ferrochromite, and containing oxides of iron, magnesium, aluminum and chromium and formed into a sintered solid solution, as described and claimed in copending application Ser. No. 727,678 of Frank C. Arrance, filed May 8, 1968, now Pat. No. 3,539,394 can be employed.

As further examples of inorganic separator materials which can be employed are sintered zirconia (zirconium dioxide) separators, e.g. calcia stabilized zirconia, and sintered alumina separators.

Preferred inorganic separator materials are those selected from the group consisting of (a) a solid solution of magnesium silicate and iron silicate, including olivine, (b) zirconia, (c) a solid solution of a major portion of magnesium oxide and a minor proportion of an oxide selected from the group consisting of zirconium dioxide, titanium dioxide, alumina and chromic oxide, (d) a solid solution of ferrochromite, (e) spinelloids and (f) alumina.

It will be understood that mixtures of the above materials can be employed.

The term "inorganic separator materials" or "sintered ceramic separator material" as employed herein is intended to denote any of the above noted sintered inorganic separator materials.

Although not preferred, an organic separator can be employed in a battery according to the invention. Suitable inert organic materials or plastics having suitable porosity characteristics which can be employed include, for example, microporous plastics such as nylon, Dynel (vinylchloride-acrylonitrile copolymer), Teflon (polytetrafluoroethylene), cellophane, regenerated cellulose, sausage casing and the like. Although such organic separators can be employed, the strength, chemical inertness, temperature resistance and electrode support characteristics of the inorganic or ceramic separators are significantly superior.

Also, flexible substantially inorganic separators can be employed. For example, flexible separators as described in U.S. application Ser. No. 676,223, filed Oct. 18, 1967, of Frank C. Arrance, now U.S. Pat. No. 3,542,596 can be utilized in batteries according to the present invention, such flexible separators comprising a major portion of an inorganic or ceramic separator material of any of the types described above, such as olivine, a minor portion of potassium titanate in short fiber form, and a minor portion of a cured organic polymeric, e.g. polyphenylene oxide, said cured organic polymer bonding the particles of said inorganic material and the potassium titanate fibers together, and forming a porous separator structure.

Additional examples of flexible substantially inorganic separators which can be employed are those described in U.S. application Ser. No. 676,224, filed Oct. 18, 1967, of C. Berger, et al., consisting essentially of a major portion of a porous inorganic material of any of the types described above, such as olivine, and a minor portion of a water coagulable organic fluorocarbon polymer such as vinylidene fluoride polymer, said polymer bonding the particles of the inorganic material together and forming a flexible membrane.

The inorganic and organic separators as above described should be of suitable porosity such that the separator walls function to retain electrolyte, and permit transfer of electrolyte ions but prevent transfer of electrode ions. A porosity in the range of from about 5% to about 50%, and most desirably in the range of about 10% to about 30%, is generally provided.

If desired, however, other types of inorganic or organic separators can be employed.

The improved zinc electrode of the invention can be employed in any type of battery such as a battery employing a zinc-silver couple or a zinc-nickel couple, together with separators of the type described and illustrated above. Also, the improved zinc electrode of the invention can be employed in zinc-fluid batteries, for example the so-called zinc-air or zinc-oxygen battery, employing a gas diffusion or catalyst electrode, e.g. a platinum electrode, and there is employed at 24 in FIG. 2 an ion conducting material such as a polystyrene type ion exchange membrane or ion conducting membrane such as zirconium phosphate.

The following are examples of practice of the invention.

EXAMPLE 1

Equimolar ratios of zinc oxide (81.4 gms.) and barium carbonate (197.4 gms.) are mixed in a ball mill in powder form. 1.5" diameter discs are formed by compaction of the resulting mixture in a circular steel die using a hydraulic press, the resulting discs being 0.080" thick. The discs are then sintered in air for about 15 hours at 1,075° C. and cooled. After cooling, the discs are hard, white and strong.

One of the sintered zinc oxide-barium oxide solid solution discs is placed against a silver current collector and assembled with two standard silver electrodes, the assembly placed in 30% potassium hydroxide and the solid solution zinc electrode is charged against the silver electrodes at 80–90 ma. and cycled several times at 250 ma. discharged. The cell capacity is 1.7 ah. (ampere hours) and the sintered solid solution zinc electrode remains unchanged and exhibiting good electrical performance and retention of original capacity after several cycles.

EXAMPLE 2

A mixture of 95% zinc oxide (1425 gms.) and 5% zirconium oxide (calcia stabilized with 5% calcium oxide) in the amount of 75 gms., are ball milled for 15 hours using polyvinyl alcohol-water as a binder. The resulting slurry is dried at 220° F. and granulated into powder form. 1.5" diameter discs of the resulting powder are compacted as described in Example 1 above. The discs so produced are sintered at 950° C. for 2 hours. After cooling to room temperature, the sintered solid solution zinc oxide-zirconium oxide discs are ground to pass a 325 mesh screen and zinc electrodes are formed by compacting into discs a mixture of 96% of the sintered zinc oxide-zirconium oxide solid solution powder and 4% of mercuric oxide.

Two of the resulting zinc electrodes are tested in separate cells A and B by inserting the respective zinc electrodes into an electrode compartment in the form of a flexible substantially inorganic separator envelope formed by impregnation of fuel cell asbestos with 2% polyphenylene oxide and applying to the thus treated fuel cell asbestos an essentially inorganic separator film consisting essentially of about 76% magnesium silicate-iron silicate (olivine) solid solution, 4% potassium titanate, 10% polyphenylene oxide, and 10% polypropylene polyazelate, the thickness of such essentially inorganic separator film being about 0.006". In each of the two test cells A and B one of such solid solution zinc electrodes contained in the above described electrode compartment or separator envelope is assembled with two conventional silver electrodes, with 30% potassium hydroxide employed as electrolyte. These respective battery assemblies are inserted into polysulfone battery cases, and tested against a control cell C assembled with a conventional zinc electrode (pasted zinc electrode containing 92% zinc oxide and 8% mercuric oxide) and two silver electrodes.

All three batteries A, B and C are charged at 120 ma. to 2.10 volts over a period of about 18–20 hours, and discharged at 1.0 A. (amperes) to 1.0 v. (volt). This cycle regime is repeated over a number of cycles. Table I below shows the cell capacity for each of the cells A, B and C after the first, tenth and twentieth cycles.

TABLE I

| Cycle No.: | Cell No. A | Cell No. B | Control cell C |
|---|---|---|---|
| 1, ah | 2.2 | 2.3 | 2.3 |
| 10, ah | 2.0 | 2.1 | 1.8 |
| 20, ah | 2.1 | 2.3 | 1.5 |

As shown from Table I above, the batteries A and B assembled with solid solution zinc oxide-zirconium oxide electrodes produced according to the invention, retain substantially all of their original capacity after 20 cycles, whereas the control battery C, employing the conventional zinc electrode, loses about 35% of its original capacity after 20 cycles.

Batteries A and B are subjected to about 60 of the above described total discharge cycles at about C/2 rate. At the end of the 60 hours, the zinc electrodes of these batteries retain substantially all of their original capacity, that is, 90% or above the original capacity. On the other hand, control battery C cycled under the same conditions retains only about 65% of early cycle capacity after about 25–35 of the same cycles.

EXAMPLE 3

Mixtures of 95% zinc oxide and 5% metallic oxide listed in Table II below are prepared in the same manner as the zinc oxide-zirconium oxide mixture of Example 2 above. All of these mixtures are sintered for 2 hours at 900° C. and allowed to cool overnight. The resulting respective solid solutions are granulated and pressed into 1.65" x 1.75" x 0.080" electrodes with silver current collectors attached to each electrode.

Each of the resulting zinc oxide-metal oxide solid solution electrodes are assembled into a battery with two silver electrodes and employing a flexible substantially inorganic separator envelope as electrode compartment for the zinc electrode, as described in Example 2 above. 30% KOH is used as electrolyte in each of the batteries.

Each of the batteries is subjected to a charge-discharge cycling regime as described in Example 2 above, and in each case the zinc oxide-metal oxide solid solution electrode of the invention retains most or substantially all of its original capacity (generally in excess of about 80% of its original capacity) after the number of cycles noted in Table II below.

TABLE II

| Zinc oxide-metal oxide solid solution electrode: | Number of cycles |
|---|---|
| ZnO-La$_2$O$_3$ | 33 |
| ZnO-MnO$_2$ | 32 |
| ZnO-CeO$_2$ | 9 |
| ZnO-BaO | 8 |
| ZnO-CuO | 9 |
| ZnO-Ag$_2$O | 9 |
| ZnO-CaO | 9 |
| ZnO-Li$_2$O | 8 |
| ZnO-MgO | 13 |
| ZnO-ZrO$_2$ | 61 |
| ZnO-TiO$_2$ | 20 |
| ZnO-SnO$_2$ | 7 |
| ZnO-Cr$_2$O$_3$ | 30 |
| ZnO-Al$_2$O$_3$ | 29 |

EXAMPLE 4

The procedure of Example 2 above is repeated, except that in each case the solid solution zinc oxide-zirconium oxide electrodes are prepared from a starting mixture of about 85% zinc oxide and about 15% zirconium oxide (calcia stabilized).

Results similar to those of Example 2 are obtained.

EXAMPLE 5

The procedure of Example 2 above is repeated, except that in each case the zinc electrodes are assembled in a battery with two conventional nickel electrodes.

Results comparable to those of Example 2 are obtained.

From the foregoing, it is seen that the invention provides for the production of novel solid solution zinc oxide-metal oxide, e.g. zirconium oxide, electrodes of improved strength and minimum slumping tendencies, and having reduced solubility in alkali, particularly potassium hydroxide aqueous solutions. Such solid solution zinc electrodes when incorporated in a high energy density battery such as a silver-zinc or nickel-zinc battery substantially increase the efficient cycling capability on deep discharge of the battery, by substantial improvement in capacity retention of the zinc electrode on charge-discharge cycling.

While I have described particular embodiments of my invention for purposes of illustration, it will be understood that various modifications and adaptations thereof may be made within the spirit of the invention, and the invention is not to be taken as limited except by the scope of the appended claims.

I claim:

1. A zinc battery electrode of improved strength and reduced solubility in alkali solutions, which comprises the combination of (a) a sintered solid solution of zinc oxide and the oxide of a metal capable of entering the zinc oxide lattice, the atomic size of said metal being about ±12% the atomic size of zinc, and (b) zinc oxide, said sintered solid solution (a) forming a substantially inert matrix for said zinc oxide, (b), the latter constituting the active electrode material.

2. A zinc battery electrode as defined in claim 1, said metal oxide being an oxide of a metal selected from the group consisting of Zr, Sn, Ti, Cr, V, Co, Fe, Al, Ga, Y, Sc, Ni, Mn, La, Ce, Ba, Mg, Cu, Ag and Li.

3. A zinc battery electrode as defined in claim 2, said metal oxide being an oxide of a metal selected from the group consisting of Zr, Ti, and Mg.

4. A zinc battery electrode as defined in claim 2, said sintered solid solution being present in minor proportion ranging from about 2 to about 25% by weight of the electrode.

5. A zinc battery electrode as defined in claim 2, said sintered solid solution containing from about 30 to about 99% zinc oxide and about 1 to about 70% of said metal oxide by weight.

6. A zinc battery electrode as defined in claim 2, said sintered solid solution being present in minor proportion ranging from about 2 to about 25% by weight of the electrode, said sintered solid solution containing from about 30 to about 99% zinc oxide and about 1 to about 70% of said metal oxide.

7. A zinc battery electrode as defined in claim 1, wherein said metal oxide is zirconium oxide.

8. A zinc battery electrode as defined in claim 4, wherein said metal oxide is zirconium oxide.

9. A zinc battery electrode as defined in claim 6, wherein said metal oxide is zirconium oxide.

10. In a battery containing electrodes and a separator between said electrodes, at least one of said electrodes being a zinc electrode as defined in claim 1.

11. In a battery containing electrodes and a separator between said electrodes, at least one of said electrodes being a zinc electrode as defined in claim 2.

12. In a battery containing electrodes and a separator between said electrodes, at least one of said electrodes being a zinc electrode as defined in claim 6.

13. In a battery containing electrodes and a separator between said electrodes, at least one of said electrodes being a zinc electrode as defined in claim 9.

14. A battery containing electrodes of opposite polarity and an inorganic separator positioned between said electrodes, at least one of said electrodes being a zinc electrode as defined in claim 2, and the other electrode being an electrode selected from the group consisting of silver and nickel.

15. A battery containing electrodes of opposite polarity and an inorganic separator positioned between said electrodes, at least one of said electrodes being a zinc electrode as defined in claim 6, and the other electrode being an electrode selected from the group of silver and nickel.

References Cited

UNITED STATES PATENTS

| | | | |
|---|---|---|---|
| 2,028,980 | 1/1936 | Korinth et al. | 106—296 |
| 2,068,294 | 1/1937 | Korinth et al. | 106—296 |
| 2,304,947 | 12/1942 | Monk | 106—296 |
| 3,091,544 | 5/1963 | Hund et al. | 106—296 X |
| 3,515,686 | 6/1970 | Bowman | 252—518 X |
| 3,436,269 | 4/1969 | Mitoff | 136—86 F |

ANTHONY SKAPARS, Primary Examiner

U.S. Cl. X.R.

106—296; 136—30; 252—518